United States Patent
Giudicelli

(10) Patent No.: US 10,945,362 B2
(45) Date of Patent: Mar. 16, 2021

(54) MODULAR HARROW APPARATUS

(71) Applicant: Bobbi Giudicelli, Grass Valley, CA (US)

(72) Inventor: Bobbi Giudicelli, Grass Valley, CA (US)

(*) Notice: Subject to any disclaimer, the term of this patent is extended or adjusted under 35 U.S.C. 154(b) by 185 days.

(21) Appl. No.: 16/167,624

(22) Filed: Oct. 23, 2018

(65) Prior Publication Data

US 2020/0120851 A1 Apr. 23, 2020

(51) Int. Cl.
*A01B 19/04* (2006.01)
*A01B 23/04* (2006.01)
*A01B 23/02* (2006.01)

(52) U.S. Cl.
CPC ............ *A01B 19/04* (2013.01); *A01B 23/02* (2013.01); *A01B 23/043* (2013.01)

(58) Field of Classification Search
CPC ......... A01B 19/04; A01B 19/08; A01B 23/02; A01B 23/043
USPC ........................................................ 172/620
See application file for complete search history.

(56) References Cited

U.S. PATENT DOCUMENTS

| | | | | |
|---|---|---|---|---|
| 40,614 A * | 11/1863 | Elward | ................. | A01B 19/08 172/34 |
| 88,046 A * | 3/1869 | Lane et al. | ............. | A01B 19/02 172/620 |
| 158,233 A * | 12/1874 | Barnet | ................. | A01B 19/02 172/620 |
| 238,533 A * | 3/1881 | Scobie | ................. | A01B 19/02 172/620 |
| 267,294 A * | 11/1882 | Wheeler | ............... | A01B 19/04 172/627 |
| 303,274 A * | 8/1884 | Francisco | ............. | A01B 19/02 172/620 |
| 442,131 A * | 12/1890 | Morris | ................. | A01B 19/02 172/620 |
| 496,036 A * | 4/1893 | Anderson et al. | ... | A01B 17/004 172/191 |
| 838,974 A * | 12/1906 | Friedemann | ......... | A01B 23/043 172/624 |
| 1,008,147 A * | 11/1911 | Heylman | ............... | A01B 19/02 172/620 |
| 1,590,131 A | 6/1926 | Swanson | | |
| 1,729,883 A | 10/1929 | Lessman | | |
| 2,096,864 A | 10/1937 | Strunk | | |
| 2,161,387 A | 6/1939 | Rodemeyer | | |
| 2,486,483 A | 11/1949 | Landen | | |
| 2,699,634 A | 1/1955 | Gortmaker | | |
| 2,716,853 A | 9/1955 | Schulte | | |

(Continued)

*Primary Examiner* — Thomas B Will
*Assistant Examiner* — Joel F. Mitchell

(57) ABSTRACT

A modular harrow apparatus for smoothing horse pens includes a vehicle carabiner that attaches to an ATV, a UTV, or a small tractor. Each of a pair of chains has a vehicle end coupled to the vehicle carabiner and a harrow end. A lead harrow bar has a pair of first front eyelets coupled to the pair of chains and a pair of first rear eyelets. A second harrow bar has a pair of second front eyelets. A pair of linkage systems is coupled between the pair of first rear eyelets of the lead harrow bar and the pair of second front eyelets of the second harrow bar. A plurality of tines is coupled to a first bottom face of the lead harrow bar and a second bottom face of the second harrow bar.

5 Claims, 4 Drawing Sheets

(56) References Cited

U.S. PATENT DOCUMENTS

| | | | | |
|---|---|---|---|---|
| 4,624,322 A | * | 11/1986 | Lowe et al. | A01B 19/02 |
| | | | | 172/620 |
| 9,371,617 B2 | * | 6/2016 | Thunstrom et al. | E01C 23/06 |
| 2002/0157371 A1 | * | 10/2002 | Van Den Engel | A01D 80/02 |
| | | | | 56/375 |

* cited by examiner

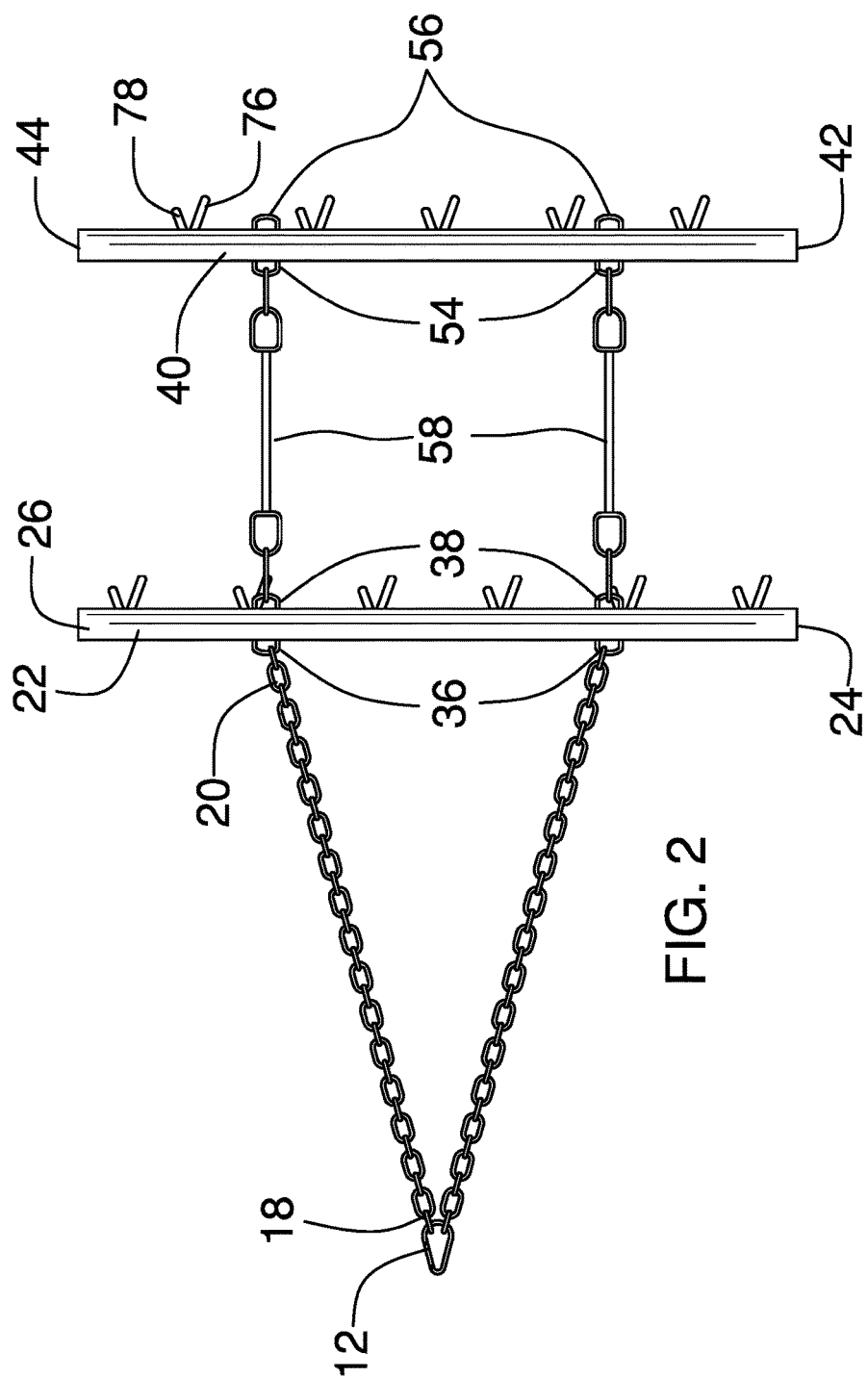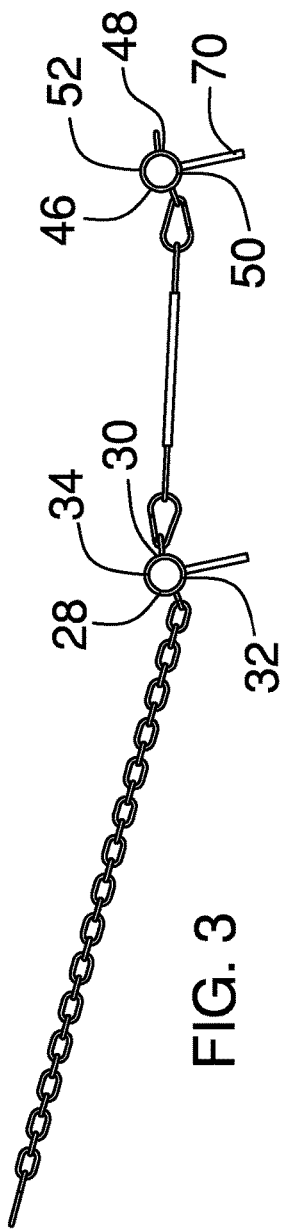
FIG. 2
FIG. 3

MODULAR HARROW APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to harrows and more particularly pertains to a new harrow for smoothing horse pens.

BRIEF SUMMARY OF THE INVENTION

An embodiment of the disclosure meets the needs presented above by generally comprising a vehicle carabiner that is configured to selectively engage with an ATV, a UTV, or a small tractor. A pair of chains is coupled to the vehicle carabiner. Each of the pair of chains has a vehicle end coupled to the vehicle carabiner and a harrow end. A lead harrow bar is coupled to the pair of chains. The lead harrow bar has a first left end, a first right end, a first leading face, a first trailing face, a first bottom face, and a first top face. A pair of first front eyelets is coupled to the first leading face proximal the first top face and a pair of first rear eyelets coupled to the first trailing face proximal the first top face. The pair of first front eyelets is coupled to the harrow end of the pair of chains. There is a second harrow bar having a second left end, a second right end, a second leading face, a second trailing face, a second bottom face, and a second top face. A pair of second front eyelets is coupled to the second leading face proximal the second top face and a pair of second rear eyelets is coupled to the second trailing face proximal the second top face. A pair of linkage systems is coupled between the pair of rear eyelets of the lead harrow bar and the pair of front eyelets of the second harrow bar of the plurality of harrow bars. A plurality of tines is coupled to the first bottom face of the lead harrow bar and the second bottom face of the second harrow bar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a top plan view of an embodiment of the disclosure.

FIG. 3 is a side elevation view of an embodiment of the disclosure.

DETAILED DESCRIPTION OF THE INVENTION

Figure 1:
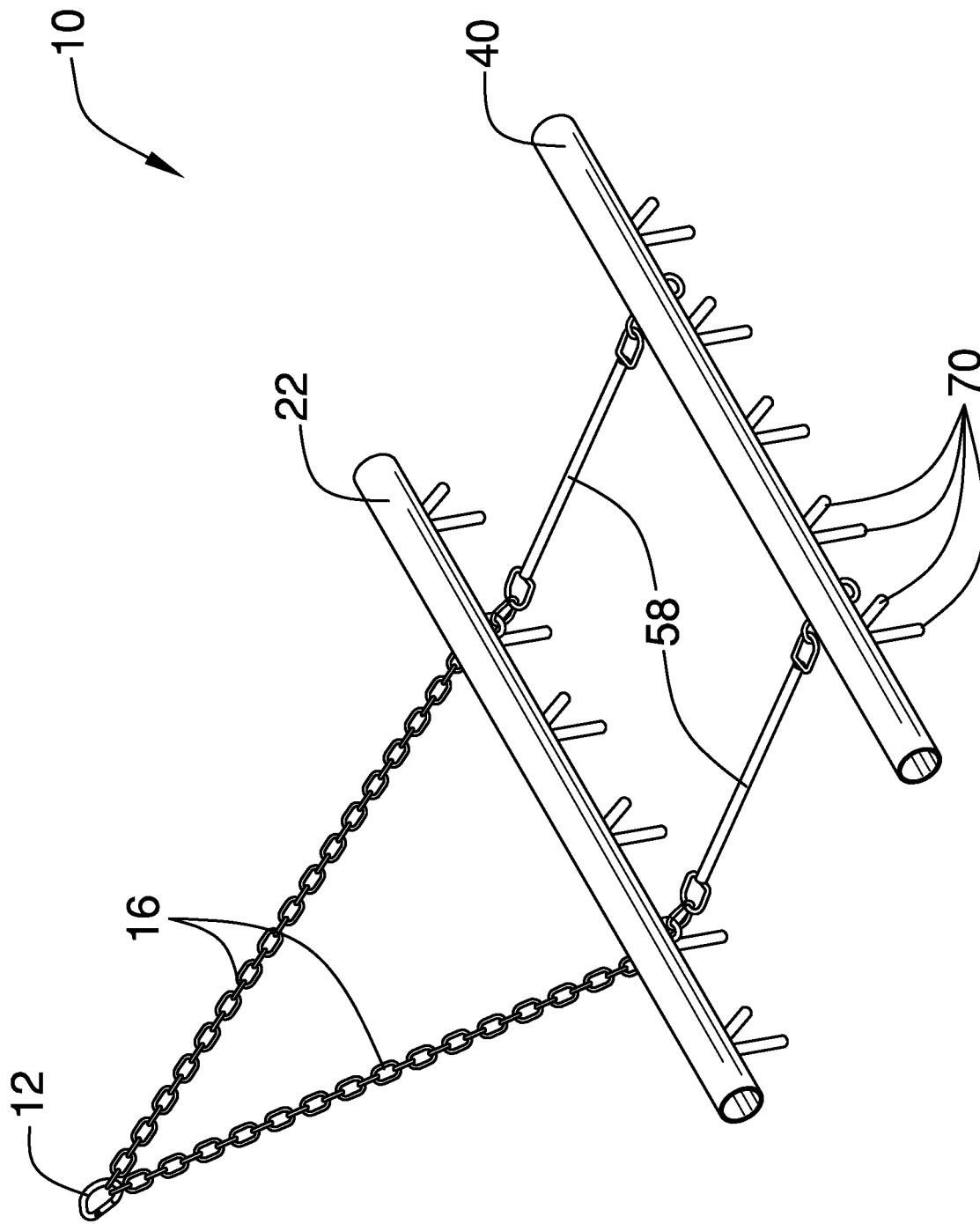
FIG. 1 is an isometric view of a modular harrow apparatus according to an embodiment of the disclosure.
Figure 4:
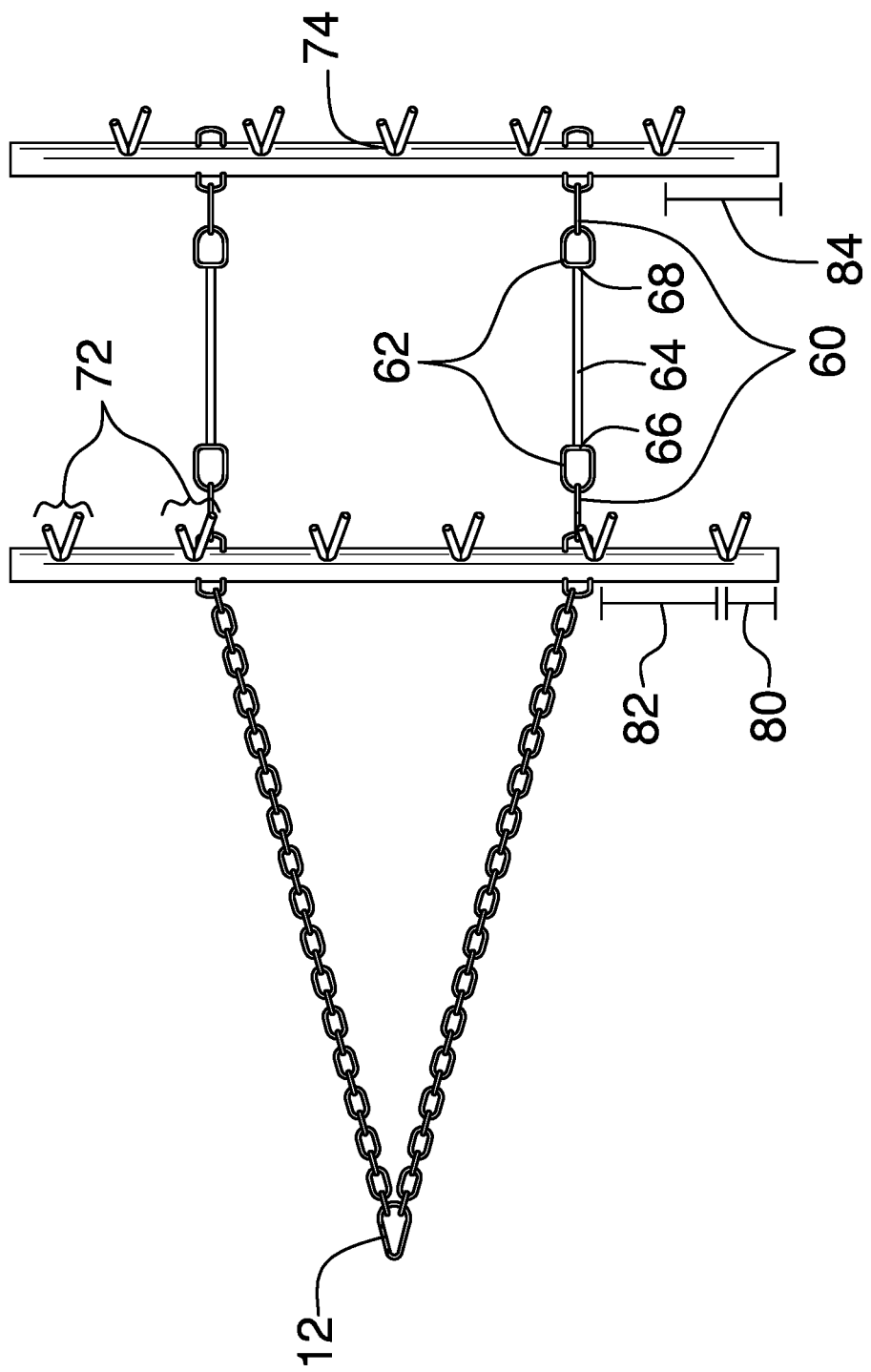
FIG. 4 is a bottom plan view of an embodiment of the disclosure.
Figure 5:
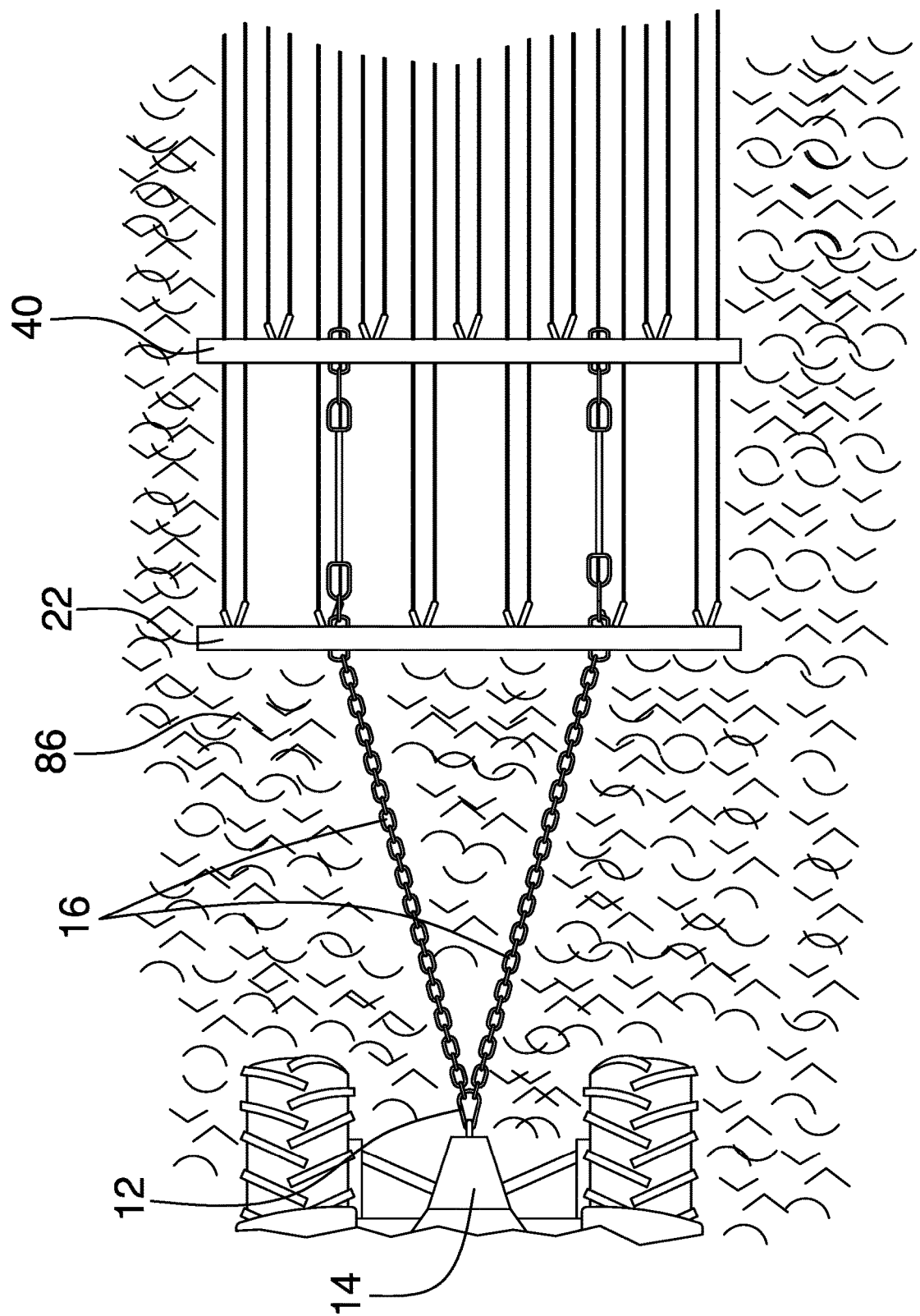
FIG. 5 is an in-use view of an embodiment of the disclosure.

With reference now to the drawings, and in particular to FIGS. 1 through 5 thereof, a new harrow embodying the principles and concepts of an embodiment of the disclosure and generally designated by the reference numeral 10 will be described.

As best illustrated in FIGS. 1 through 5, the modular harrow apparatus 10 generally comprises a vehicle carabiner 12 configured to selectively engage with an ATV 14, a UTV, or a small tractor. A pair of chains 16 has a vehicle end 18 coupled to the vehicle carabiner 12 and a harrow end 20. A lead harrow bar 22 is coupled to the pair of chains 16 and has a first left end 24, a first right end 26, a first leading face 28, a first trailing face 30, a first bottom face 32, and a first top face 34. A pair of first front eyelets 36 is coupled to the first leading face 28 proximal the first top face 32 and a pair of first rear eyelets 38 is coupled to the first trailing face 30 proximal the first top face 32. The pair of first rear eyelets 38 may be 180° from the pair of first front eyelets 36. The pair of first front eyelets 36 is coupled to the harrow end 20 of the pair of chains. There may be a second harrow bar 40 having a second left end 42, a second right end 44, a second leading face 46, a second trailing face 48, a second bottom face 50, and a second top face 52. A pair of second front eyelets 54 is coupled to the second leading face 46 proximal the second top face 50 and a pair of second rear eyelets 56 is coupled to the second trailing face 48 proximal the second top face 50. The pair of second rear eyelets 56 may be 180° from the pair of second front eyelets 54. Each of the lead harrow bar 22 and the second harrow bar 40 should weigh no more than 17 pounds.

A pair of linkage systems 58 may be coupled to the lead harrow bar 22 and the second harrow bar 40. Each of the pair of linkage systems 58 may comprise a pair of linkage carabiners 60, a pair of D-rings 62, and a linkage bar 64. The pair of D-rings 62 is coupled to a front end 66 and a back end 68 of the linkage bar, the pair of linkage carabiners 60 is coupled to the pair of D-rings 62, and the pair of D-rings 62 is selectively engageable with the pair of first rear eyelets 38 of the lead harrow bar and the pair of second front eyelets 54 of the second harrow bar.

A plurality of tines 70 is coupled to each of the lead harrow bar 22 and the second harrow bar 40. The plurality of tines 70 may comprise a plurality of tine pairs 72, each of the tine pairs being a V-shape and having a vertex 74. Each of the tine pairs 72 may have a long tine 76 and a short tine 78. The vertex 74 is coupled to each of the first bottom face 32 of the lead harrow bar and the second bottom face 50 of the second harrow bar and may be 30° from the pair of first front eyelets 36 and the pair of second front eyelets 54 and 150° from the pair of first rear eyelets 38 and the pair of second rear eyelets 56, respectively. The plurality of tine pairs 72 may be eleven pairs with six tine pairs coupled to the lead harrow bar 22 and five tine pairs coupled to the second harrow bar 40. The plurality of tine pairs 72 is coupled to the lead harrow bar 22 a first end distance 80 from the first left end 24 and the first right end 26 and a gap distance 82 between each adjacent tine pair, and to the second harrow bar 40 a second end distance 84 from the second left end 42 and the second right end 44 and the gap distance between each adjacent tine pair. The second end distance 84 is greater than the first end distance 80 to stagger the tine pairs between the lead harrow bar 22 and the second harrow bar 40. The first end distance 80 may be 7.62 cm, the second end distance 84 may be 20.3 cm, and the gap distance 82 may be 20.3 cm.

In use, the vehicle carabiner 12 is coupled to the ATV 14, UTV, or small tractor to drag the lead harrow bar 22 and, optionally, the second harrow bar 40 with the plurality of tines 70 loosening the dirt of a horse pen 86. The second harrow bar 50 may also be rotated such that the second top face 52 contacts the ground to smooth the dirt. An additional lead harrow bar 22 may be coupled to the pair of second rear eyelets 56 of the second harrow bar with an additional pair of linkage systems 58 for the modular harrow apparatus 10 to be used with three harrow bars.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A modular harrow apparatus comprising:
a vehicle carabiner, the vehicle carabiner being configured to selectively engage with an ATV, a UTV, or a small tractor;
a pair of chains coupled to the vehicle carabiner, each of the pair of chains having a vehicle end coupled to the vehicle carabiner and a harrow end;
a lead harrow bar coupled to the pair of chains, the lead harrow bar having a first left end, a first right end, a first leading face, a first trailing face, a first bottom face, and a first top face, a pair of first front eyelets coupled to the first leading face, a pair of first rear eyelets coupled to the first trailing face, the pair of first front eyelets being coupled to the harrow end of the pair of chains;
a second harrow bar, the second harrow bar having a second left end, a second right end, a second leading face, a second trailing face, a second bottom face, and a second top face, a pair of second front eyelets coupled to the second leading face, a pair of second rear eyelets coupled to the second trailing face, the pair of first front eyelets and the pair of second front eyelets being 180° from the pair of first rear eyelets and the pair of second rear eyelets, respectively;
a pair of linkage systems coupled to the lead harrow bar and the second harrow bar, the pair of linkage systems being coupled between the pair of first rear eyelets of the lead harrow bar and the pair of second front eyelets of the second harrow bar; and
a plurality of tines coupled to each of the lead harrow bar and the second harrow bar, the plurality of tines being coupled to each of the first bottom face of the lead harrow bar and the second bottom face of the second harrow bar the plurality of tines comprising a plurality of tine pairs, each of the tine pairs being a V-shape and having a vertex, the vertex being coupled to each of the first bottom face of the lead harrow bar and the second bottom face of the second harrow bar, the vertex of each of the plurality of tine pairs being coupled 30° from the pair of first front eyelets and the pair of second front eyelets and 150° from the pair of first rear eyelets and the pair of second rear eyelets on the lead harrow bar and the second harrow bar, respectively.

2. The modular harrow apparatus of claim 1 further comprising each of the pair of linkage systems comprising a pair of linkage carabiners, a pair of D-rings, and a linkage bar, the pair of D-rings being coupled to a front end and a back end of the linkage bar, the pair of linkage carabiners being coupled to the pair of D-rings, and the pair of linkage carabiners being selectively engageable with the pair of first rear eyelets of the lead harrow bar and the pair of second front eyelets of the second harrow bar.

3. The modular harrow apparatus of claim 1 further comprising each of the tine pairs having a long tine and a short tine.

4. The modular harrow apparatus of claim 1 further comprising the plurality of tine pairs being coupled to the lead harrow bar a first end distance from the first left end and the first right end and a gap distance between each adjacent tine pair, the plurality of tine pairs being coupled to the second harrow bar a second end distance from the second left end and the second right end and the gap distance between each adjacent tine pair, the second end distance being greater than the first end distance to stagger the tine pairs between the lead harrow bar and the second harrow bar.

5. A modular harrow apparatus comprising:
a vehicle carabiner, the vehicle carabiner being configured to selectively engage with an ATV, a UTV, or a small tractor;
a pair of chains coupled to the vehicle carabiner, each of the pair of chains having a vehicle end coupled to the vehicle carabiner and a harrow end;
a lead harrow bar coupled to the pair of chains, the lead harrow bar having a first left end, a first right end, a first leading face, a first trailing face, a first bottom face, and a first top face, a pair of first front eyelets coupled to the first leading face, a pair of first rear eyelets coupled to the first trailing face 180° from the pair of first front eyelets, the pair of first front eyelets being coupled to the harrow end of the pair of chains;
a second harrow bar, the second harrow bar having a second left end, a second right end, a second leading face, a second trailing face, a second bottom face, and a second top face, a pair of second front eyelets coupled to the second leading face, a pair of second rear eyelets coupled to the second trailing face 180° from the pair of second front eyelets;
a pair of linkage systems coupled to the lead harrow bar and the second harrow bar, each of the pair of linkage systems comprising a pair of linkage carabiners, a pair of D-rings, and a linkage bar, the pair of D-rings being coupled to a front end and a back end of the linkage bar, the pair of linkage carabiners being coupled to the pair of D-rings, and the pair of linkage carabiners being selectively engageable with the pair of first rear eyelets of the lead harrow bar and the pair of second front eyelets of the second harrow bar; and
a plurality of tines coupled to each of the lead harrow bar and the second harrow bar, the plurality of tines comprising a plurality of tine pairs, each of the tine pairs being a V-shape and having a vertex, each of the tine pairs having a long tine and a short tine, the vertex being coupled to each of the first bottom face of the lead harrow bar and the second bottom face of the second harrow bar 30° from the pair of first front eyelets and the pair of second front eyelets and 150° from the pair of first rear eyelets and the pair of second rear eyelets, respectively, the plurality of tine pairs being coupled to the lead harrow bar a first end distance from the first left end and the first right end and a gap distance between each adjacent tine pair, the plurality of tine pairs being coupled to the second harrow bar a second end distance from the second left end and the second right end and the gap distance between each adjacent tine pair, the second end distance being greater than the first end distance to stagger the tine pairs between the lead harrow bar and the second harrow bar.

* * * * *